United States Patent [19]

Fukunaga et al.

[11] Patent Number: 5,195,228
[45] Date of Patent: Mar. 23, 1993

[54] ROLL FOR FIXING UNIT

[75] Inventors: Noritomo Fukunaga, Tokyo; Mitiyoshi Kurosawa, Kitamine, both of Japan

[73] Assignee: Kinyosha Co., Ltd., Tokyo, Japan

[21] Appl. No.: 784,423

[22] PCT Filed: Dec. 25, 1990

[86] PCT No.: PCT/JP90/01685
§ 371 Date: Nov. 12, 1991
§ 102(e) Date: Nov. 12, 1991

[87] PCT Pub. No.: WO91/14211
PCT Pub. Date: Sep. 19, 1991

[30] Foreign Application Priority Data

Mar. 16, 1990 [JP] Japan .................... 2-65860

[51] Int. Cl.$^5$ .............................. B21B 31/08
[52] U.S. Cl. ........................ 29/130; 29/132
[58] Field of Search ............. 29/128, 130, 132, 110

[56] References Cited

U.S. PATENT DOCUMENTS

| | | | |
|---|---|---|---|
| 4,309,803 | 1/1982 | Blaszak | 29/130 |
| 4,378,622 | 4/1983 | Pinkston | 29/130 X |
| 4,425,694 | 1/1984 | Somerville | 29/132 X |
| 4,823,689 | 4/1989 | Kishino et al. | 29/132 X |

Primary Examiner—Timothy V. Eley
Assistant Examiner—C. Richard Martin
Attorney, Agent, or Firm—Nixon & Vanderhye

[57] ABSTRACT

The present invention provides a roll for a fixing unit including a sponge layer which has a multiple of through holes parallel to a longitudinal direction of a metal core and aligned in a circumferential direction of the metal core at a predetermined gap, or a through hole helically formed along the longitudinal direction of the metal core, and which is formed on a circumferential surface of the metal core, and a surface coating layer applied on a circumferential surface of the sponge layer.

The present invention also provides a roll for a fixing unit, characterized by including a sponge layer which has a multiple of through holes parallel to a longitudinal direction of a metal core and aligned in a circumferential direction of the metal core at a predetermined gap, or a through hole helically formed along the longitudinal direction of the metal core, and which is formed on a circumferential surface of the metal core, and a surface coating layer made of fluoroplastic applied on a circumferential surface of the sponge layer through an adhesive layer and having a thickness of 20 to 150 μm, wherein at least one of the sponge layer, the adhesive layer, and the surface covering layer has a volume resistivity of not more than $10^9$ Ω·cm.

14 Claims, 6 Drawing Sheets

ROLL FOR FIXING UNIT

TECHNICAL FIELD

The present invention relates to an improvement of a roll for a fixing unit of an electrophotographic copying machine, an electronic printer, and the like which is used for thermally fixing a non-fixed image on a recording material such as paper.

BACKGROUND ART

Figure 11:
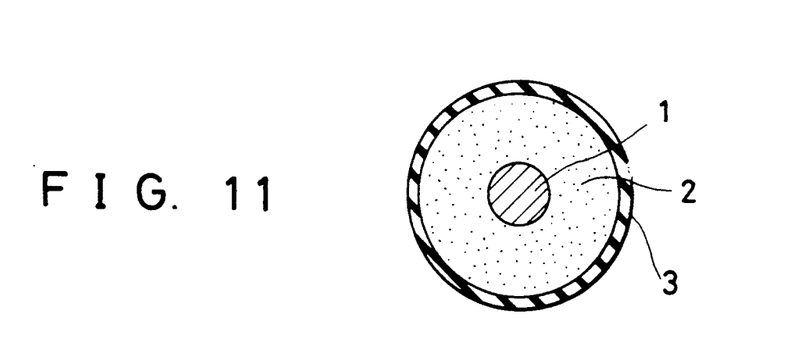
FIG. 11 is a sectional view of a conventional roll for a fixing unit.
Figure 12:
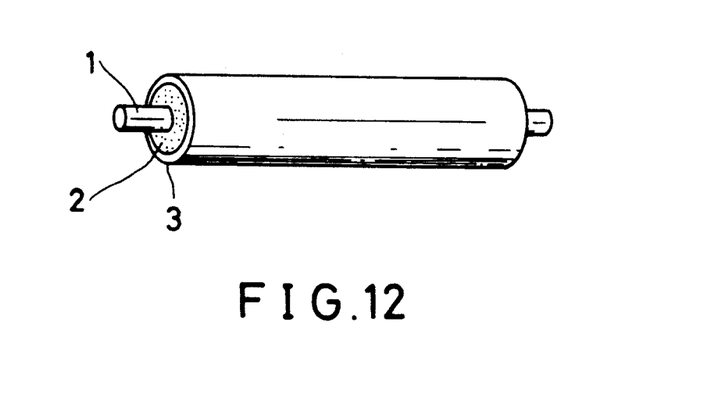
FIG. 12 is a perspective view of FIG. 11.

Recently, as the size and weight of an electrophotographic copying machine and the like have been reduced, the size and weight of a roll for a fixing unit used in its fixing device have been reduced. For example, a roll for a fixing unit is conventionally known in which a sponge layer 2 is formed on a circumferential surface of a metal core 1 and a surface coating layer 3 is formed on an outer circumferential surface of the sponge layer 2, as shown in FIGS. 11 and 12. Since this roll uses the sponge layer 2, the hardness of the roll surface is low. Hence, even when the diameter of the roll is reduced, a sufficient nip width required for thermal fixing can be obtained, and the roll for a fixing unit has advantages such as light weight.

Such a roll for a fixing unit is manufactured in, e.g., the following manner.

① First, an adhesive is coated on an outer circumferential surface of the metal core 1 and a rubber material is applied on it. The rubber material is heated to be vulcanized and foamed, thus forming the sponge layer 2. Alternatively, using an extruder, the rubber material is formed by continuous extrusion in advance, and the extruded rubber material is heated to be vulcanized and foamed, thereby forming a sponge tube. Then, a metal core is mounted inside the sponge tube to form the sponge layer.

② Then, a liquid rubber is casted onto an outer circumferential surface of the sponge layer 2 and hardened to form the surface coating layer 3, thereby obtaining a roll. The surface coating layer 3 can be formed by fitting a preformed tube.

Generally, in a fixing unit of an electrophotographic copying machine and the like, heat of a temperature of 150° to 200° C. is applied to the roll for a fixing unit in order to perform thermal fixing. However, in the conventional roll for a fixing unit described above, since the material constituting the sponge layer and the gas in cells thermally expand, a change in outer diameter is large as compared with a polymer material usually used in a roll for a fixing unit, and a change in nip width is also large.

When the temperature of the surface of the roll is not uniform, a local expansion difference occurs in the roll outer diameter, resulting in a non-uniform nip width. For example, when the size of the recording paper is changed and paper continuously passes not over the entire surface but over a partial surface of the roll, only the partial portion where the paper passes is deprived of heat. The nip width is changed due to a difference in thermal expansion between the paper non-contact portion and the paper contact portion, resulting in wrinkles.

When heat is applied to the sponge layer, the pressure inside the cells is increased as the gas thermally expands. Therefore, the cells expand to increase the outer diameter of the roll. At the same time, however, the gas in the cells has a nature to permeate outside the roll through the cell membranes to equilibrate the pressure. As a result, the increased outer diameter of the roll gradually becomes small. In this case, regarding the diffusing state of the gas in the cells, the gas in the cells at the two end portions of the roll can be easily diffused to the two end faces, whereas the gas in the cells at the central portion of the roll cannot easily permeate outside the roll because of the influence of the surface coating layer through which the gas cannot easily permeate. As a result, the change in roll diameter is not uniform between the central roll portion and the two end portions. When a non-fixed image is to be fixed, wrinkles are formed.

Fluoroplastic is often used as a material of the surface coating layer. Although fluoroplastic has a good heat resistance, it can be charged very easily. Thus, the surface of the roll for a fixing unit is charged to several thousands to several ten thousands of volts when it contacts copy paper and the like during thermal fixing. As a result, paper dust and toner are electrically adsorbed to the surface of the roll to impair the high separation performance of the surface of fluoroplastic, resulting in occurrence of toner offset after use for a short period of time.

DISCLOSURE OF INVENTION

The present invention has been made in view of the above situation, and has as its object to provide a small, light weight, roll for a fixing unit capable of obtaining a good fixed image, preventing formation of wrinkles when a non-fixed image is to be fixed, and preventing occurrence of offset by suppressing charging, thus prolonging the service life of the roll for a fixing unit.

The present invention provides a roll for a fixing unit, comprising a sponge layer which has a multiple of through holes parallel to a longitudinal direction of a metal core and aligned in a circumferential direction of the metal core at a predetermined gap, or a through hole helically formed along the longitudinal direction of the metal core, and which is formed on a circumferential surface of the metal core, and a surface coating layer formed on a circumferential surface of the sponge layer.

The multiple of through holes parallel to the longitudinal direction of the metal core and aligned in the circumferential direction of the metal core or a through hole helically formed along the longitudinal direction of the metal core is formed in the sponge layer so that a heated gas in cells present in the sponge layer, especially at its central portion, is quickly diffused to the outside from the two ends of the roll and expansion of the sponge layer caused by the thermal expansion of the gas in the cells is suppressed, thereby decreasing a change in outer diameter of the roll to be smaller than in a conventional roll.

The types of the through holes can be as follows:

① through holes which are parallel to the longitudinal direction of the metal core and arranged in a ring-like shape in the circumferential direction of the metal core, although not shown;

② through holes which are arranged in a double ring-like shape such that each of those on an outer side is located between adjacent ones of those on an inner side, as shown in FIG. 1; and ③ through holes having a triangular section and arranged in a ring-like shape to be close to each other.

The sectional shape of the through holes is not specifically limited. However, it is preferable that the thickness of the sponge layer be substantially the same throughout the entire portion of the roll so that a change in outer diameter of the roll upon heating becomes uniform in the circumferential direction of the roll.

Two methods are available as means for forming a through hole in the sponge layer.

(1) Straight through hole

A rubber material tube having voids is formed by extrusion by changing the structure of a die of an extruder, which is used in a known method of continuously forming a sponge tube, and is vulcanized and foamed to form a rubber tube by heating.

(2) Helical through hole

Figure 4:
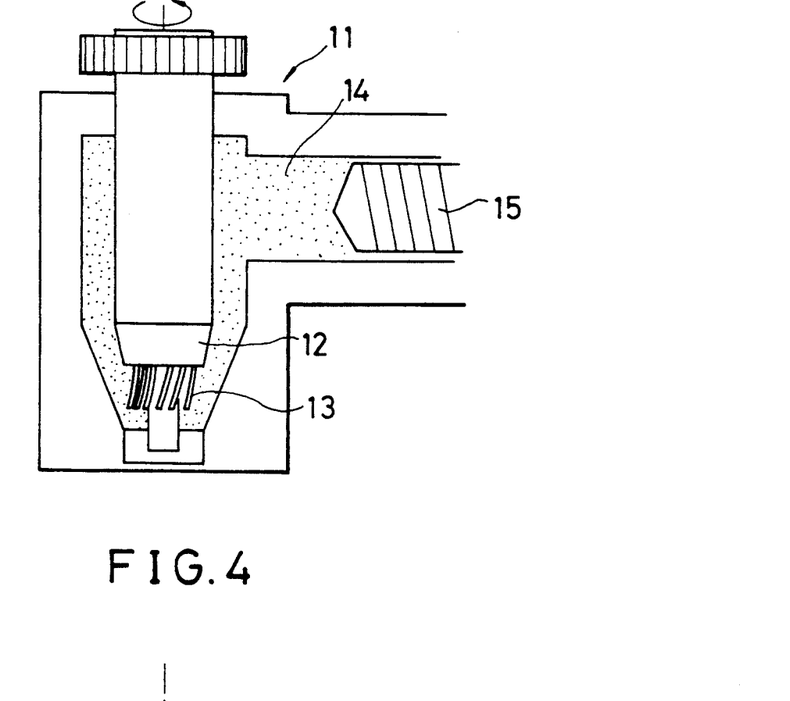
FIGS. 4 and 5 are views for explaining an extruder used in the present invention.

For example, as shown in FIG. 4, a multiple of twisted pins 13 are provided to a torpedo 12 of an extruder 11. A rubber material 14 is formed by extrusion by a screw 15 while rotating the torpedo 12. The formed rubber is heated to be vulcanized and foamed (which method is employed when a plurality of helical through holes are to be formed).

Figure 5:
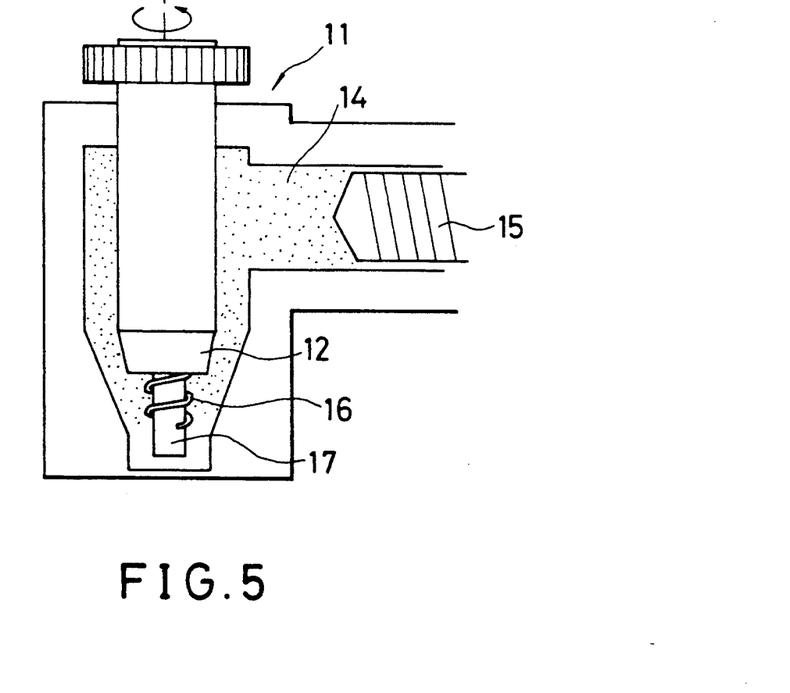

Alternatively, as shown in FIG. 5, a single helical pin 16 is provided to the torpedo at a small gap from a core 17. A rubber material 14 is formed by extrusion by a screw 15 while rotating the torpedo 12. The formed rubber is heated to be vulcanized and foamed (which method is employed when a single helical through hole is to be formed). In this case, the helical pin may contact the core 17.

The material of the sponge layer can be an EPDM rubber sponge, silicone sponge, fluororubber sponge, or the like.

The present invention also provides a roll for a fixing unit, characterized by comprising a sponge layer which has a multiple of through holes parallel to a longitudinal direction of a metal core and aligned in a circumferential direction of the metal core at a predetermined gap, or a through hole helically formed along the longitudinal direction of the metal core, and which is formed on a circumferential surface of the metal core, and a surface coating layer made of fluoroplastic applied on a circumferential surface of the sponge layer through an adhesive layer and having a thickness of 20 to 150 μm, wherein at least one of the sponge layer, the adhesive layer, and the surface coating layer has a volume resistivity of not more than $10^9$ Ω·cm.

The thickness of the surface coating layer is set to fall within a range of 20 to 150 μm because, if it is less than 20 μm, the surface coating layer will wear out after use for a short period of time; and if it is more than 150 μm, the surface covering layer will have a high hardness and a sufficient nip width cannot be obtained.

Regarding the volume resistivity, it is sufficient if at least any one of the sponge layer, the adhesive layer, and the surface covering layer has a volume resistivity of $10^9$ Ω·cm in order to prevent the roll from being charged. More particularly, for the prevention of charging, the volume resistivity of the surface coating layer is preferably set to $10^9$ Ω·cm or less. Usually, however, in order to decrease the volume resistivity, a filler such as carbon or a metal powder is used. The high separation performance of fluoroplastic is thus impaired as it is influenced by carbon and the like. Therefore, in order to maintain the high separation performance, it is preferable that the volume resistivity of either the sponge layer or the adhesive layer be decreased. In this case, the antistatic effect is more or less degraded compared to a case in which the volume resistivity of the surface covering layer is decreased.

According to the roll for a fixing unit of the present invention, a roll having an antistatic effect can be obtained by setting the volume resistivity of at least any one of the sponge layer, the adhesive layer, and the surface covering layer to $10^9$ Ω·cm or less.

Since the sponge layer having a multiple of through holes parallel to a longitudinal direction of a metal core and aligned in a circumferential direction of the metal core at a predetermined gap, or a through hole helically formed along the longitudinal direction of the metal core, is provided, wrinkles can be prevented during fixing of a non-fixed image, and occurrence of toner offset can be suppressed.

BRIEF DESCRIPTION OF DRAWINGS

FIG. 1 is a sectional view of a roll for a fixing unit according to Example 1,

FIG. 2 is a sectional view of a roll for a fixing unit according to Example 2,

FIG. 3 is a sectional view of a roll for a fixing unit according to Example 3,

BEST MODE OF CARRYING OUT THE INVENTION

Example 1

A roll for a fixing unit according to the present invention will be described together with its manufacturing method with reference to FIG. 1.

① First, 100 parts by weight of a silicone rubber (tradename: KE903 U, manufactured by Shin-Etsu Chemical Co., Ltd.), 1 part by weight of a silicone rubber vulcanizing agent (tradename: C-1, manufactured by Shin-Etsu Chemical Co., Ltd.), 3 parts by weight of a silicone rubber vulcanizing agent (tradename: C-3, manufactured by Shin-Etsu Chemical Co., Ltd.), and 2 parts by weight of a silicone rubber foaming agent (tradename: KE-P-13, manufactured by Shin-Etsu Chemical Co., Ltd.) are sufficiently mixed to manufacture a silicone rubber compound (Si mixture).

② Subsequently, using the Si mixture as the raw material, a rubber material tube having voids aligned in two coaxial circles was formed by continuous extrusion using an extruder. The rubber tube was heated at 250° C. for 20 minutes to be vulcanized and foamed, thus forming a silicone rubber sponge tube having voids. A metal core 21, an outer circumferential surface of which was coated with an adhesive and which had a diameter of 10 mm, was inserted in this sponge tube.

(3) Subsequently, the adhesive was hardened, and the sponge tube was polished until the outer diameter of the roll was 23 mm, thus obtaining a sponge layer 22.

At this time, a multiple of through holes 23a and 23b parallel to the longitudinal direction of the metal core 21 and aligned in the circumferential direction of the metal core 21 are formed in the sponge layer 22. Each of the outer through holes 23b is arranged between adjacent ones of the inner through holes 23a.

(4) Subsequently, a silicone rubber (tradename: KE12RTV, manufactured by Shin-Etsu Chemical Co., Ltd.) was cast onto the circumferential surface of the sponge layer 22 integral with the metal core 21, by casting, and was hardened. The surface was polished until the outer diameter was 24 mm to form a surface coating layer 24, thereby obtaining a roll for a fixing unit.

In the roll for a fixing unit manufactured in this manner, the surface covering layer 24 is provided on the outer circumferential surface of the metal core 21 through the sponge layer 22, and the multiple of through holes 23a and 23b parallel to the longitudinal direction of the metal core 21 and aligned in the circumferential direction of the metal core 21 are provided in the sponge layer 22.

When the roll having this structure is heated, gas not only near the two ends of the roll but also at the central portion of the roll are diffused from the two ends of the roll through the through holes 23a and 23b. Therefore, the outer diameter of the roll expands substantially uniformly, and wrinkles can be decreased.

Example 2

When a roll for a fixing unit shown in FIG. 2 is compared with that having the structure shown in FIG. 1, it is characterized in that through holes 31 having a triangular section are arranged close to each other such that the vertexes P of the triangles face inward and outward alternately.

In this roll for a fixing unit, since the thickness of the sponge layer 22 excludes the triangular through holes 31, the sponge layer 22 has a substantially uniform thickness at any portion thereof. For example, a thickness $T_1$ is equal to a thickness $T_2$. As a result, deformation with respect to the outer diameter caused by heating of the sponge layer 22 becomes more uniform, and wrinkles can be further decreased.

Changes in maximum outer diameters of each of the roll for a fixing units according to Examples 1 and 2 and of the conventional roll for a fixing unit, when they were heated at 180° C. for 10 minutes and 180° C. for 30 minutes, respectively, were actually examined. The result as shown in Table 1 below was obtained. Note that an average outer diameter of the roll before heating is 20.00 mm.

TABLE 1

|  | Embodiment 1 | Embodiment 2 | Conventional |
| --- | --- | --- | --- |
| Maximum outer diameter (mm) of roll after heating at 180° C. for 10 min. | 27.73 | 24.61 | 25.01 |
| Maximum outer diameter (mm) of roll after heat- | 24.79 | 24.77 | 24.98 |

TABLE 1-continued

|  | Embodiment 1 | Embodiment 2 | Conventional |
| --- | --- | --- | --- |
| ing at 180° C. for 30 min. | | | |

Figure 6:
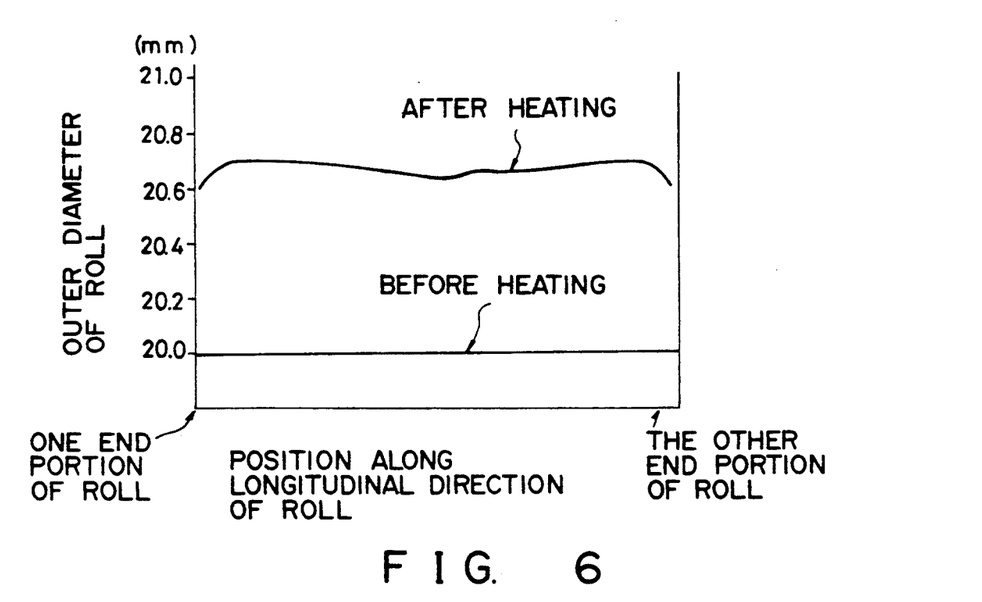
FIGS. 6 and 7 are graphs indicating the outer diameter sizes of the roll for a fixing unit of the present invention before and after heating.
Figure 7:
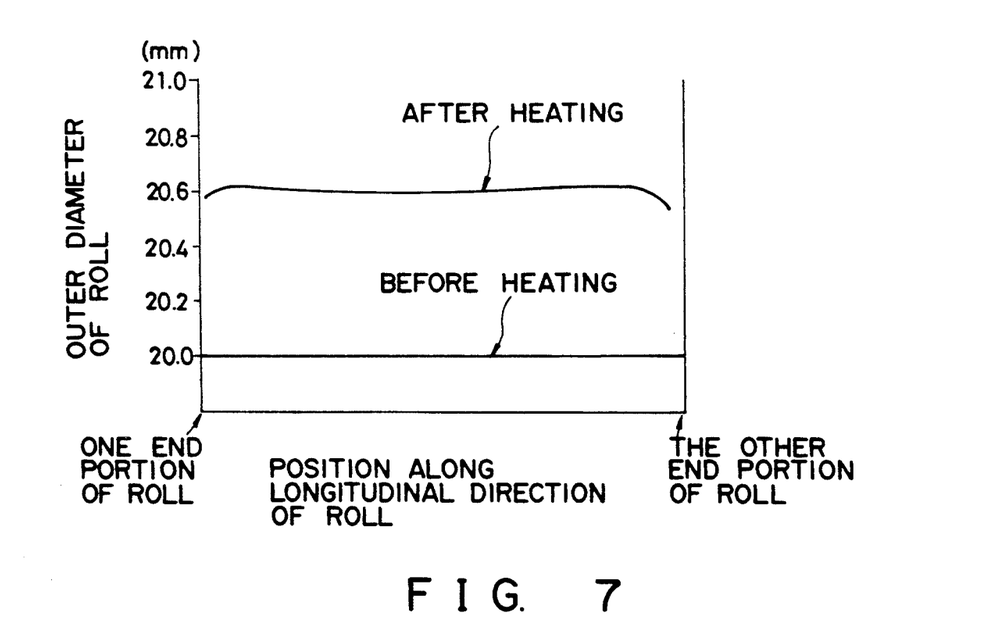
Figure 13:
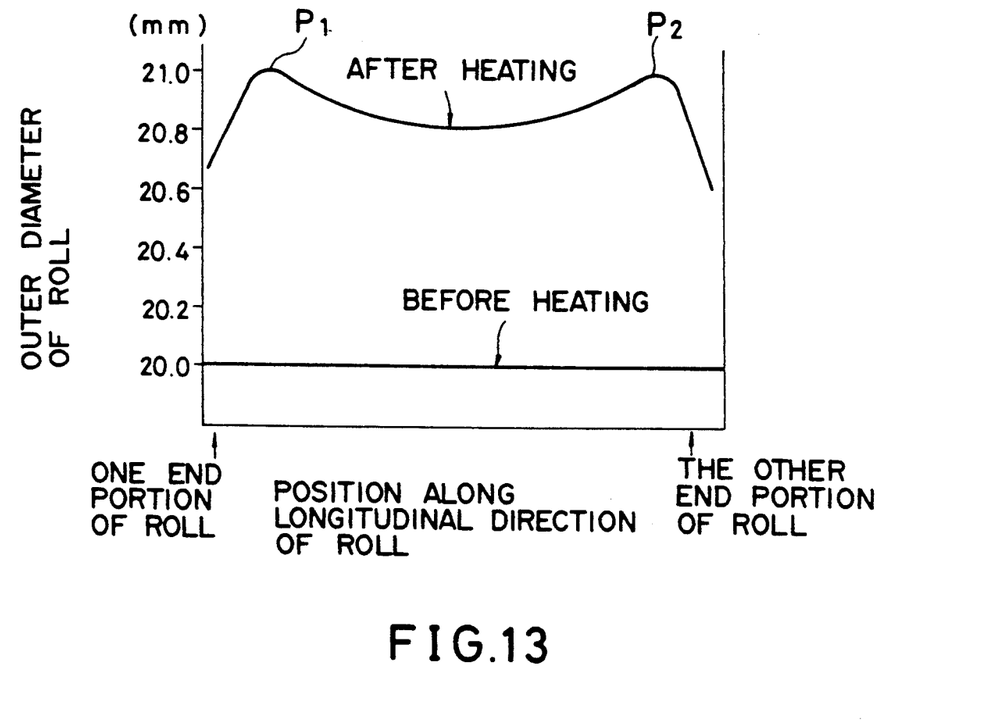
FIG. 13 is a graph indicating outer diameter sizes of the conventional roll for a fixing unit before and after heating.

As is apparent from Table 1, the change in outer diameter of the roll according to the present invention is smaller than that of the conventional roll by about 0.2 mm to 0.4 mm. When the outer diameters of each roll in the longitudinal direction before and after heating were examined, graphs shown in FIG. 6 (Example 1), FIG. 7 (Example 2), and FIG. 13 (conventional roll) were obtained. From these results, it was confirmed that acute peaks $P_1$ and $P_2$ appeared in the vicinities of the two ends of the conventional roll, whereas no such peaks appeared in any roll of the present invention and the roll as a whole expanded substantially uniformly.

Example 3

Figure 8:
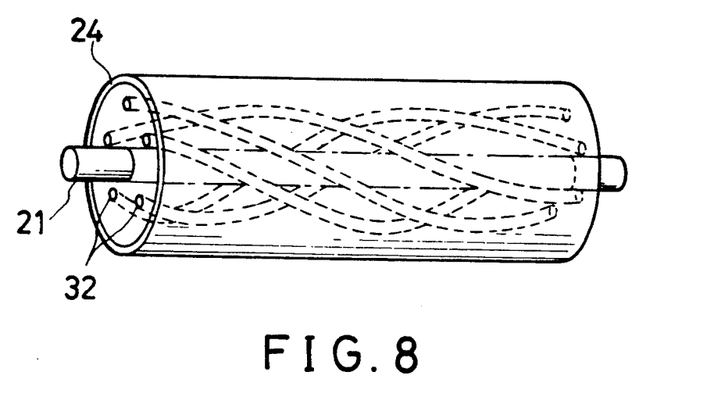
FIGS. 8 and 9 are perspective views showing arranging states of through holes of the roll for a fixing unit of the present invention.
Figure 9:
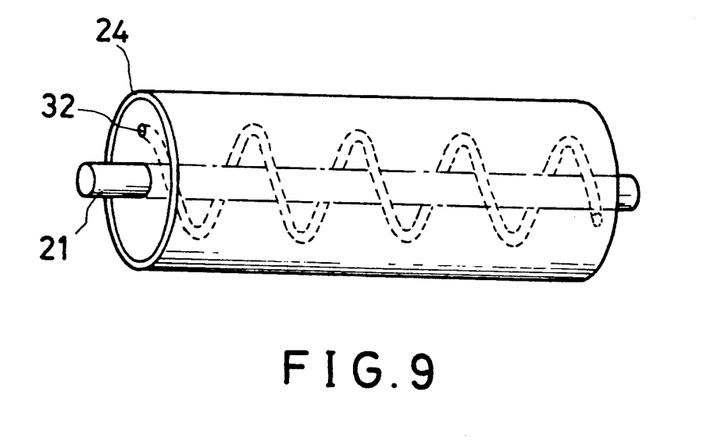

A roll for a fixing unit according to Example 3 has, e.g., five helical through holes 32, as shown in FIG. 8. Such through holes 32 are formed by performing extrusion by using the extruder shown in FIG. 4 or 5 described above and by vulcanization and foaming upon heating. The number of the helical through holes 32 can be one, as shown in FIG. 9. Even with the roll for a fixing unit having this structure, deformation with respect to the outer diameter of the sponge layer 22 caused by heating becomes more uniform, and wrinkles can be further decreased.

The above embodiments exemplify a case (shown in FIG. 1) in which the through holes are formed in a ring-like shape in the sponge layer by two coaxial circles and a case (shown in FIG. 2) in which the section of each through hole is triangular. However, the present invention is not limited to this. For example, as shown in FIG. 3, a multiple of continuous notched portions 33 may be formed in portions of the sponge layer 22 that contact the metal core 21, and the gas may be discharged from the notched portions 33 to the outside. It must be noted that the notched portions 33 must be formed such that the sponge layer 22 will not be affected by the pressure.

Example 4

Figure 10:
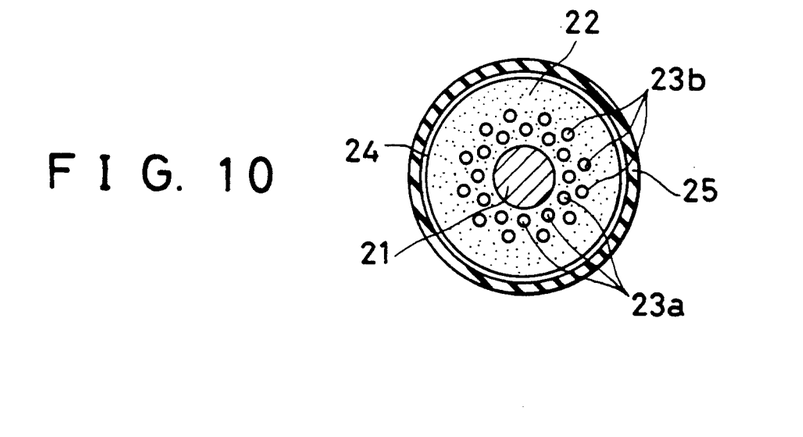
FIG. 10 is a sectional view of a roll for a fixing unit according to Example 4 of the present invention.

A roll for a fixing unit of Example 4 will be described together with its manufacturing method with reference to FIG. 10.

(1) First, 60 parts by weight of a silicone rubber 1 (tradename: KE903 U, manufactured by Shin-Etsu Chemical Co., Ltd.), 40 parts by weight of a silicone rubber 2 (tradename: KE3601 U, manufactured by Shin-Etsu Chemical Co., Ltd.), 1 part by weight of a silicone rubber vulcanizing agent (tradename: C-1, manufactured by Shin-Etsu Chemical Co., Ltd.), 3 parts by weight of a silicone rubber vulcanizing agent (tradename: C-3, manufactured by Shin-Etsu Chemical Co., Ltd.), and 2 parts by weight of a silicone rubber foaming agent (tradename: KE-P-13, manufactured by Shin-Etsu Chemical Co., Ltd.) are sufficiently mixed to manufacture a silicone rubber compound (Si mixture).

(2) Subsequently, using the Si mixture as the raw material, a rubber material tube having voids aligned in two rounds was obtained by continuous extrusion using an extruder. The rubber tube was heated at 250° C. for 20 minutes to be vulcanized and foamed, thus forming a silicone rubber sponge tube having voids. A metal core 21, an outer circumferential surface of which is coated with an adhesive and which has a diameter of 10 mm, was inserted in this sponge tube.

③ ( Subsequently, the adhesive was hardened, and the sponge tube was polished until the outer diameter of the roll was 24 mm, thus obtaining a sponge layer 22. At this time, a multiple of through holes 23a and 23b parallel to the longitudinal direction of the metal core 21 and aligned in the circumferential direction of the metal core 21 are formed in the sponge layer 22. Each of the outer through holes 23b is arranged between adjacent ones of the inner through holes 23a. Furthermore, the volume resistivity of the sponge layer 22 is $2.5 \times 10^7$ $\Omega$ cm.

④ Subsequently, a one-component RTV silicone (tradename: KE45, manufactured by Shin-Etsu Chemical Co., Ltd.) was coated as an adhesive layer 24 on the circumferential surface of the sponge layer 22 integrated with the metal core 21. This assembly was fitted in a tube made of an ethylene tetrafluorideperfluoroalkoxyethylene copolymer and having an inner diameter of 23.8 mm and a thickness of 50 $\mu$m, in order to form a surface layer 25. A roll for a fixing unit was thus manufactured.

In the roll for a fixing unit manufactured in this manner, the sponge layer 22 having a volume resistivity of $2.5 \times 10^7$ $\Omega$ cm is provided on the outer circumferential surface of the metal core 21, the surface layer 25 is provided on the outer circumferential surface of the sponge layer 22 through the adhesive layer 24, and the multiple of through holes 23a and 23b parallel to the longitudinal direction of the metal core 21 and aligned in the circumferential direction of the metal core 21 are provided in the sponge layer 22. As a result, since the volume resistivity of the sponge layer 22 is set to $2.5 \times 10^7$ $\Omega$ cm, charging of the roll surface can be suppressed, and occurrence of toner offset can be suppressed. When the roll having this structure is heated, the gas not only near the two ends of the roll but also at the central portion of the roll are diffused from the two ends of the roll through the through holes 23a and 23b. Therefore, the outer diameter size of the roll is increased substantially uniformly, and formation of wrinkles can be decreased.

Example 5

In Example 5, a roll for a fixing unit was manufactured by using the same sponge layer as in Example 4 except that silicone sponge 2 was not used and 100 parts by weight of a silicone rubber 1 was used. As an adhesive layer, one-component RTV silicone rubber (tradename: KE4576, manufactured by Shin-Etsu Chemical Co., Ltd.) having a volume resistivity of 20 $\Omega$·cm was used. Except that, a fixing roller was manufactured following the same procedures as in Example 1.

Example 6

In embodiment 6, the sponge layer is the same as that of Example 5 except that 100 parts by weight of silicone rubber 1 was used. As the adhesive layer, a silicone rubber having a tradename of KE45 was used. As the surface layer, 8 parts by weight of carbon black (tradename: Kechin Black EC, manufactured by Nippon EC Co., Ltd.) were added to an ethylene tetrafluorideperfluoroalkoxyethylene copolymer to provide a volume resistivity of $7.0 \times 10^5$ $\Omega$·cm. Except that, a roll for a fixing unit was manufactured following the same procedures as in Example 4.

The charge amount of the roll surface and copy count of each of the roll for a fixing units according to Examples 4, 5, and 6 described above and of the conventional roll for a fixing unit (all layers of which have a high volume resistivity) until toner offset occurred were examined. A result shown in the following Table 2 was obtained.

TABLE 2

|  |  | Examples | | | Comparative |
|---|---|---|---|---|---|
|  |  | 1 | 2 | 3 | Example |
| Volume resistivity | 1st layer | $2.5 \times 10^7$ | $4.0 \times 10^{14}$ | $4.0 \times 10^{14}$ | $4.0 \times 10^{14}$ |
|  | 2nd layer | $6.0 \times 10^{13}$ | 20 | $6.0 \times 10^{13}$ | $6.0 \times 10^{13}$ |
|  | 3rd layer | $1 \times 10^{15}$ or more | $1 \times 10^{15}$ or more | $7.0 \times 10^{15}$ | $1 \times 10^{15}$ or more |
| Charge amount |  | 0 to 480 | 0 to 230 | 0 to 50 | 3,000 |
| Copy count |  | 100,000 or more | 100,000 or more | 100,000 or more | 25,000 |

Note that, as is apparent from Table 2, the unit of resistivity is $\Omega$·cm and that the unit of the charge amount is volt V. The first, second, and third layers indicate the sponge, adhesive, and surface coating layers, respectively.

As is apparent from Table 2, when the roll according to the present invention was used, it was confirmed that the charge amount of the roll surface and the copy count were much larger than those in the roll of the comparative example.

In the above embodiments, the through holes are formed in a ring-like shape in the sponge layer in two rounds to extend in the longitudinal direction of the metal core. However, the present invention is not limited to this. The sectional shape of each through hole may be triangular, or helical.

In the above embodiments, any one of the sponge, adhesive, and surface layers has a volume resistivity of $10^9$ $\Omega$·cm or less. However, the present invention is not limited to this, and all the layers or any two arbitrary layers may have a volume resistivity of $10^9$ $\Omega$·cm or less.

INDUSTRIAL APPLICABILITY

According to the present invention, a small, light weight roll for a fixing unit is obtained which is capable of obtaining a good fixed image, preventing formation of wrinkles when a non-fixed image is to be fixed, and preventing occurrence of offset by suppressing charging, thus prolonging the service life of the roll for a fixing unit. Therefore, the present invention is suitably applicable to a roll for a fixing unit of an electrophotographic copying machine or an electronic printer which thermally fixes a non-fixed image on a recording material such as paper.

We claim:
1. A roll for a fixing unit, comprising:
   a rod-like metal core;
   a sponge layer covering the core and provided with a plurality of through holes spaced (i) parallel with one another in the longitudinal direction of the core, (ii) a predetermined radial distance form the core, and (iii) equidistant from one another in the circumferential direction, said through holes enabling the release of air from the sponge in response to exposure of the roll to temperature above ambient temperature; and a surface layer covering the sponge layer.

2. A roll for a fixing unit according to claim 1, wherein said plurality of through holes in said sponge layer are arranged concentrically about an axis of said metal core.

3. A roll for a fixing unit according to claim 1, wherein said plurality of through holes in said sponge layer are arranged in multiple concentric rings such that each of said through holes on an outer ring thereof is located between adjacent ones of said through holes on an inner ring thereof.

4. A roll for a fixing unit according to claim 1, wherein said through holes have a substantially triangular cross-section.

5. A roll for a fixing unit according to claim 1, wherein said sponge layer is made of a material selected from a group consisting of an EPDM rubber sponge, a silicone sponge, and a fluororubber sponge.

6. A roll for a fixing unit according to claim 1, wherein said surface layer is made of a material selected from a group consisting of silicone rubber, fluororubber and fluoroplastic.

7. A roll for a fixing unit, comprising:
a rod-like metal core;
a sponge layer covering the core and provided with at least one through hole extending spirally in the longitudinal direction of the core, said through holes enabling the release of air from the sponge in response to exposure of the roll to temperatures above ambient temperature; and
a surface layer covering the sponge layer.

8. A roll for a fixing unit according to claim 7, wherein said plurality of through holes in said sponge layer are arranged concentrically about an axis of said metal core.

9. A roll for a fixing unit according to claim 7, wherein said plurality of through holes in said sponge layer are arranged in multiple concentric rings such that each of said through holes on an outer ring thereof is located between adjacent ones of said through holes on an inner ring thereof.

10. A roll for a fixing unit according to claim 7, wherein said through holes have a substantially triangular cross-section.

11. A roll for a fixing unit according to claim 7, wherein said sponge layer is made of a material selected from a group consisting of an EPDM rubber sponge, a silicone sponge, and a fluororubber sponge.

12. A roll for a fixing unit according to claim 7, wherein said surface layer is made of a material selected from a group consisting of silicone rubber, fluororubber and fluoroplastic.

13. A roll for a fixing unit, comprising:
a rod-like metal core;
a sponge layer covering the core and provided with a plurality of through holes spaced (i) parallel to one another in the longitudinal direction of the core, (ii) a predetermined radial distance from the core, and (iii) equidistant from one another in the circumferential direction; and
a fluorine resin surface layer covering the sponge layer with an adhesive layer interposed therebetween, said surface layer having thickness of 20 to 150 $\mu$m, and at least one of said sponge layer, adhesive layer and surface layer having a volume resistivity of not more than $10^9$ $\Omega$·cm.

14. A roll for a fixing unit, comprising:
a rod-like metal core;
a sponge layer covering the core and provided with at least one through hole extending spirally in the longitudinal direction of the core; and
a fluorine resin surface layer covering the sponge layer with an adhesive layer interposed therebetween, said surface layer having thickness of 20 to 150 $\mu$m, and at least one of said sponge layer, adhesive layer and surface layer having a volume resistivity of not more than $10^9$ $\Omega$·cm.

* * * * *